(12) United States Patent
Sato et al.

(10) Patent No.: US 7,047,314 B2
(45) Date of Patent: May 16, 2006

(54) DUPLICATE PRIVATE ADDRESS TRANSLATING SYSTEM AND DUPLICATE ADDRESS NETWORK SYSTEM

(75) Inventors: Yoshikazu Sato, Saitama (JP); Kanji Hiraoka, Kanagawa (JP); Masami Mori, Tokyo (JP); Takaaki Miyata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 924 days.

(21) Appl. No.: 10/025,892

(22) Filed: Dec. 26, 2001

(65) Prior Publication Data

US 2002/0087721 A1 Jul. 4, 2002

(30) Foreign Application Priority Data

Dec. 28, 2000 (JP) ............................. 2000-401170
May 24, 2001 (JP) ............................. 2001-155177

(51) Int. Cl.
*G06F 15/173* (2006.01)
(52) U.S. Cl. .................... 709/238; 709/228; 709/242; 709/245; 370/352; 370/389; 370/401; 370/466; 370/475; 726/15
(58) Field of Classification Search ................ 709/228, 709/238, 242, 245; 370/352, 389, 401, 466, 370/475; 726/15
See application file for complete search history.

(56) References Cited

U.S. PATENT DOCUMENTS 6,128,664 A * 10/2000 Yanagidate et al. ......... 709/228

6,456,625 B1 * 9/2002 Itoi ............................ 370/401
6,591,306 B1 * 7/2003 Redlich ....................... 709/245
6,912,589 B1 * 6/2005 Jain et al. ................... 709/238

FOREIGN PATENT DOCUMENTS

JP     10-308762    11/1998
JP     11-127217    11/1999

* cited by examiner

*Primary Examiner*—Yves Dalencourt
(74) *Attorney, Agent, or Firm*—Venable LLP; Michael A. Sartori; Catherine M. Voorhees

(57) ABSTRACT

A plurality of private address spaces where private addresses may possibly overlap are connected with a global address space. Respective private address spaces possess VLAN-IDs as identification information for VLANs. When connecting the respective private address spaces with the Internet, a duplicate network address translating device performs, with VLAN-ID and the private address of the respective private address spaces in pairs, mutual translation between the private address and global address of the Internet. A duplicate addresses-handling server is provided with a routing table which shows the relationship between virtual interfaces corresponding to VLAN-IDs and addresses of the respective private address spaces. A server portion of the duplicate addresses-handling server records, if a request is made from apparatuses of a private address space, the request and VLAN-ID, refers to, if making a response thereto, the routing table, selects a virtual interface which corresponds to the address of the response receiver, and makes a response. A virtual interface processing portion gives an applicable VLAN-ID and carries out an output to a switching hub.

5 Claims, 18 Drawing Sheets

| GLOBAL ADDRESS | (PORT NUMBER) |
|---|---|
| ggg.ggg.ggg.ggg | n1 |
| ggg.ggg.ggg.ggg | n2 |
| ... | ... |
| ggg.ggg.ggg.ggg | n3 |

↑ TRANSLATION WHEN ENTERING THE PRIVATE SIDE

↓ TRANSLATION WHEN EXITING TO THE INTERNET SIDE

| PRIVATE ADDRESS | (PORT NUMBER) | ADDITIONAL INFORMATION (VLAN-ID) |
|---|---|---|
| ppp.ppp.ppp.ppp | m1 | k1 |
| ppp.ppp.ppp.ppp | m2 | k2 |
| ... | ... | ... |
| ppp.ppp.ppp.ppp | m3 | k3 |

FIG. 4

| DESTINATION | GATEWAY | MASK | INTERFACE |
|---|---|---|---|
| ... | ... | ... | ... |
| 192.168.1.0 | * | 255.255.255.0 | eth0 |
| 192.168.1.0 | * | 255.255.255.0 | vlan0004 |
| 192.168.1.0 | * | 255.255.255.0 | vlan0005 |
| 192.168.1.0 | * | 255.255.255.0 | vlan0006 |
| ... | ... | ... | ... |

| IMPORTANT ITEM | RESPONSE RECEIVER'S IP ADDRESS | ADDITIONAL INFORMATION (VLAN-ID) |
|---|---|---|
| m1 | ppp.ppp.ppp.ppp | 4 |
| m2 | ppp.ppp.ppp.ppp | 5 |
| ---------- | -------------------------- | ---------- |
| m3 | ppp.ppp.ppp.ppp | 6 |

FIG.18

DUPLICATE PRIVATE ADDRESS TRANSLATING SYSTEM AND DUPLICATE ADDRESS NETWORK SYSTEM

BACKGROUND OF THE INVENTION

1. Field of the Invention

The present invention relates to a duplicate private address translating system for connecting a plurality of network spaces constructed by private network addresses with a space having a global network address such as the Internet.

The present invention also relates to a network system constructed such that, in a plurality of networks in which apparatuses use private addresses based on a specific protocol such as, for example, private IP addresses in each network and also a duplicate of private addresses between the respective networks are permitted, servers for processing requests from such apparatuses are connected to these networks.

2. Description of Related Art

The Internet assigns unique addresses referred to as IP (Internet Protocol) addresses to various network apparatuses including computers, thereby enabling communications between apparatuses. The IP addresses are integral values used for identification between apparatuses that perform communications in networks connected using TCP/IP as protocols. The integral value has, for example, a 4-byte length under a specification of IPv4 and a 16-byte length under the subsequent specification of IPv6.

For carrying out communications between the respective apparatuses, since it is necessary to discriminate a respective apparatus according to IP addresses, all apparatuses connected to an identical network must have an IP address that are different from each other. Therefore, apparatuses connected to the Internet must have unique IP addresses. As a matter of course, if the network is not connected to the Internet, IP addresses that do not overlap within the network can be freely assigned.

As IP addresses, there are special addresses referred to as private addresses and it is assured that these addresses are not used on the Internet. Private addresses can be used when constructing a network that is independent of the Internet. For carrying out communications between a network composed of private addresses and the Internet, a method for relaying by means of the Proxy and NAT (Network Address Translation) is generally employed.

Herein, NAT is a technique that can be used when connecting a network composed of private addresses to the Internet and has a role to mutually translate a global IP address and the private addresses. Moreover, the Proxy has functions as a proxy server that makes, based on a request from a client in a private address space, a request to a global address space in place of the client and also sends, in response to the client in the private address space, a response from the global address space to the request.

As an example of such a proxy server, the HTTP Proxy will be described. HTTP Proxy plays a role to receive, from a client, an HTTP request to a Web server, issue the HTTP request to the Web server on the Internet in place of the client, and sends a response from the server back to the client. Since it is the Proxy that actually issues the HTTP request to the Web server on the Internet, communications using an HTTP protocol can be performed between the server and client even if the client side is of a private address.

On the other hand, as a technique for constructing a large-scale private network at low cost, a VPN (Virtual Private Network) is provided. For example, according to the VPN by an MPLS (Multi Protocol Label Switching) technique, foundation of an MPLS network is carried out on the carrier's side. On the subscriber's side, private networks respectively possessed by the subscriber's locally independent units, such as a head office and branch offices, are connected with the MPLS network independently. In this way, each subscriber can construct a large-scale independent private network, while maintaining a high-degree of security.

However, in a case where it is intended to connect such a plurality of IP address spaces composed of private addresses to the Internet, for example, if the carrier, which has provided the VPN services as described above, further carries out an access service to the Internet, the following problem has been experienced.

Since the plurality of private address spaces are independent of each other, there in general is a possibility that private addresses of one address space have been used in other address spaces. In such a case, if it is intended to simply connect the plurality of independent private address spaces and perform translation by means of NAT, a collision between IP addresses occurs, therefore the expected process cannot be performed.

Therefore, as a means for solving such a problem, installation of apparatuses for NAT, that is equivalent to the private address spaces in number, can be considered. However, if the above-described VPN carrier has, for example, 1000 subscribers, 1000 apparatuses for NAT become necessary. If the scale is large, such a solution cannot be a realistic solution.

In addition thereto, there are techniques disclosed, for example, in Japanese Patent Kokai No. Hei 11-127217, Japanese Patent Kokai No. Hei 10-308762 and the like. However, these techniques are not techniques for connecting a plurality of private address spaces with a global address space and therefore could not become solutions to the above-described problem in that private addresses collide with each other.

Furthermore, in a case where consideration is given to providing a plurality of private address spaces as mentioned above with Proxy functions, for example, if the carrier, which has provided the above-described VPN services, intends to further provide, by means of the Proxy functions, a home page browsing service on the Internet as one of its access services, the following problem has existed.

As mentioned above, since the plurality of private address spaces are independent of each other, there is, in general, a possibility that private addresses of one address space have been used in other address spaces. If it is intended to simply connect the plurality of independent private address spaces and provide Proxy functions, a collision between IP addresses occurs, therefore the expected process cannot be performed.

Therefore, as a means for solving such a problem, installation of apparatuses for NAT, that is equivalent to the private address spaces in number, can be considered. However, for example, if the above-described VPN carrier has 1000 subscribers, 1000 apparatuses for NAT become necessary. When the scale is large, such a solution cannot be a realistic solution.

OBJECTS AND SUMMARY OF THE INVENTION

In order to solve the aforementioned problems, the present invention employs the following constructions.

<Construction 1-1>

In a duplicate address translating system which uses private addresses based on a specific protocol in respective private networks and also connects a plurality of private networks, which permit duplicate assignment of the private addresses between the respective private networks, with a global network which uses a global address based on the specific protocol, the improvement comprises:

an address translating means for performing, in the plurality of private networks, for communications data having identification information for identifying the respective private networks, mutual translation between the plurality of private addresses and the global address with a combination of identification information and private addresses.

<Construction 1-2>

A duplicate private address translating system as set forth in Construction 1-1 described above, wherein the address translating means comprises;

a switching hub which performs, for communications data having VLAN-IDs for identifying virtual LAN groups that are realized inside the plurality of private address networks, switching based on the VLAN-IDs and a duplicate network address translating device which performs, for frames which are to be switched by the switching hub and have private addresses and VLAN-IDs, mutual translation between the private addresses and the global address with a combination of the VLAN-IDs and private addresses.

<Construction 1-3>

A duplicate private address translating system as set forth in Construction 1-1 described above, wherein the address translating means is an MPLS router-cum-network address translating device which performs, for frames having MPLS labels for identifying the plurality of private networks, routing of an MPLS network based on the MPLS labels and also performs, for frames having the MPLS labels and private addresses, mutual translation between the private addresses and the global address with a combination of the MPLS labels and the private addresses.

<Construction 1-4>

A duplicate private address translating system as set forth in Construction 1-1 described above, wherein the address translating means comprises;

an MPLS edge router which performs, for frames having MPLS labels for identifying the plurality of private networks, routing of an MPLS network based on the MPLS labels and also translates the MPLS labels into VLAN-IDs for identifying virtual LAN groups that are realized inside the plurality of private networks and a duplicate address translating device which performs, for frames having VLAN-IDs and private addresses that are translated by the MPLS edge router, mutual translation between the private addresses and the global address with a combination of the VLAN-IDs and the private addresses.

In order to solve the aforementioned problems concerning the Proxy functions, the present invention employs the following constructions.

<Construction 2-1>

A duplicate address network system wherein apparatuses use addresses based on a specific protocol in respective networks and which also comprises a plurality of networks which permit duplicate assignment of addresses between the respective networks and a duplicate addresses-handling server which is connected to the plurality of networks via a switching means which performs switching based on identification information of the respective networks, wherein the duplicate addresses-handling server comprises:

a routing table showing the relationship between virtual interfaces which correspond to identification information and network addresses;

a server portion in which the identification information has been related to the virtual interfaces beforehand and which stores, if receiving an arbitrary request from an apparatus in any of the networks, the request and identification information attached to the request, and makes, if making a response to the request, reference to the routing table, selects a virtual interface which has been related to the identification information and with which the network address of a response receiver coincides, and makes a response to the virtual interface, and a plurality of virtual interfaces for receiving data of the server portion, and further comprises:

a virtual interface processing portion which adds, if receiving response data from any virtual interface, the received identification information which has been related to the virtual interface in the routing table and sends the data to the switching means.

<Construction 2-2>

A duplicate address network system wherein apparatuses use addresses based on a specific protocol in respective networks and which also comprises; a plurality of networks which permit duplicate assignment of addresses between the respective networks and a duplicate addresses-handling server which is connected to the plurality of networks via a switching means which performs switching based on identification information of the respective networks, wherein the duplicate address server comprises:

a duplicate address translating portion which performs, if sending and receiving data to and from the switching means, mutual translation between a combination of the identification information of data and the addresses and a combination of a specific address and different respective ports and a server portion which accepts a request at the specific address and different respective ports via the duplicate address translating portion and sends response data to the request with the specific address and the applicable port toward the duplicate address translating portion.

BRIEF DESCRIPTION OF THE DRAWINGS

FIG. 4 is an explanatory diagram of the translating tables of Example 1.

FIG. 18 is an explanatory diagram of a correspondence table between request items and response receivers of Example 1.

DETAILED DESCRIPTION OF THE PREFERRED EMBODIMENTS

EXAMPLE 1

<Construction 1>

Figure 1:
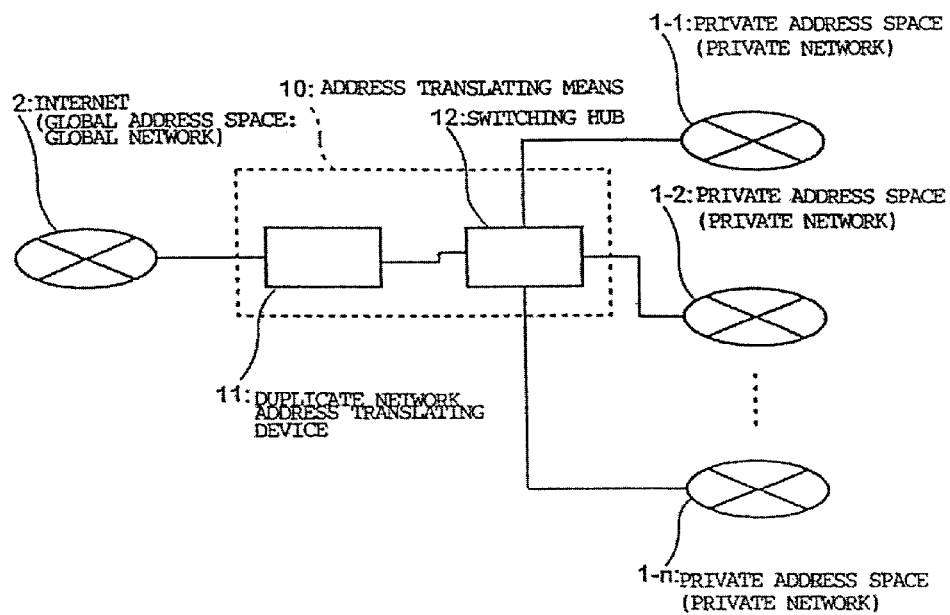
FIG. 1 is a constructional diagram showing Example 1 of the duplicate private address translating system according to the present invention.

FIG. 1 is a constructional diagram showing Example 1 of the duplicate private address translating system according to the present invention.

In the drawing, 1-1, 1-2, . . . , and 1-n denote private address spaces (private networks), respectively, and these private address network spaces 1-1, 1-2, . . . , and 1-n are connected to the Internet 2 as a global network via an address transferring means 10. In the following examples, these private address network spaces 1-1, 1-2, . . . , and 1-n and the Internet 2 are regarded as IP address spaces.

In each of the private address spaces 1-1, 1-2, . . . , and 1-n, addition of an arbitrary private address is permitted and as a result, there is a possibility that overlap of IP addresses occurs in different private address spaces. In addition, since the private address spaces 1-1, 1-2, . . . , and 1-n have common constructions, the following description will be made by simply referring to each as a private address space 1.

Furthermore, in each private address space 1, V(virtual) LAN of IEEE802.1Q-compatible frames is constructed. This VLAN is a technique for virtually realizing an identical LAN between different networks by using VLAN tags in frame headers (which will be described later).

Figure 2:
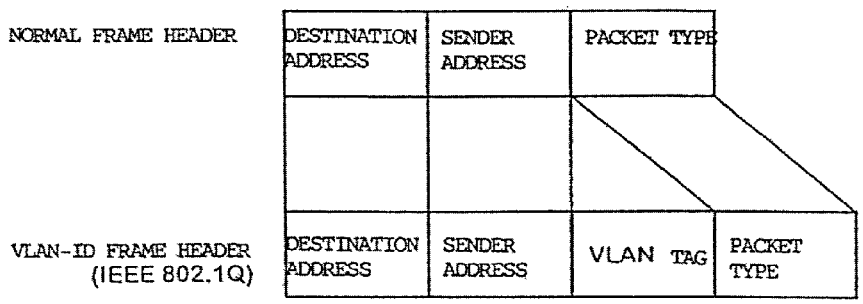
FIG. 2 is an explanatory diagram of the VLAN-ID compatible frame header of Example 1.

FIG. 2 is an explanatory diagram of the VLAN-ID compatible frame header of Example 1.

As illustrated, a 32 bit-long VLAN tag (VLAN-ID) is added on the heels of a destination address and a sender's address. This VLAN tag is identification information indicating which group the terminal belongs to in the VLAN, and a switching hub 12 performs switching based on the VLAN tag. Thus, even between different networks, a LAN can be handled as if it were an identical LAN. In addition, overlap of IP addresses within an identical group in the VLAN does not exist.

Returning to FIG. 1, the Internet 2 is a global address space to which a unique IP address is added.

An address translating means 10 has a function to perform, for communications data having VLAN tags as identification information for identifying the respective private address spaces 1, with a combination of the VLAN tags and private addresses, mutual translation between said private address and a global address, and comprises a duplicate network address translating device 11 and a switching hub 12. The duplicate network address translating means 11 is an IP address translating device which performs, based on a combination (a pair) of a VLAN tag of a packet, which has been switched by the switching hub 12, and a private address of the private address space 1, mutual translation with respect to a global address on the Internet 2 side, and has a translation table (not illustrated) for the mutual translation. The switching hub 12 is a switching hub which performs switching of packets compatible with the VLAN-ID, and has a function to perform switching to the duplicate network address translating device 11 if the destination address is a global address and performs normal switching if the destination address is a private address.

<Operations>

Hereinafter, operations of Example 1 will be described.

Figure 3A:
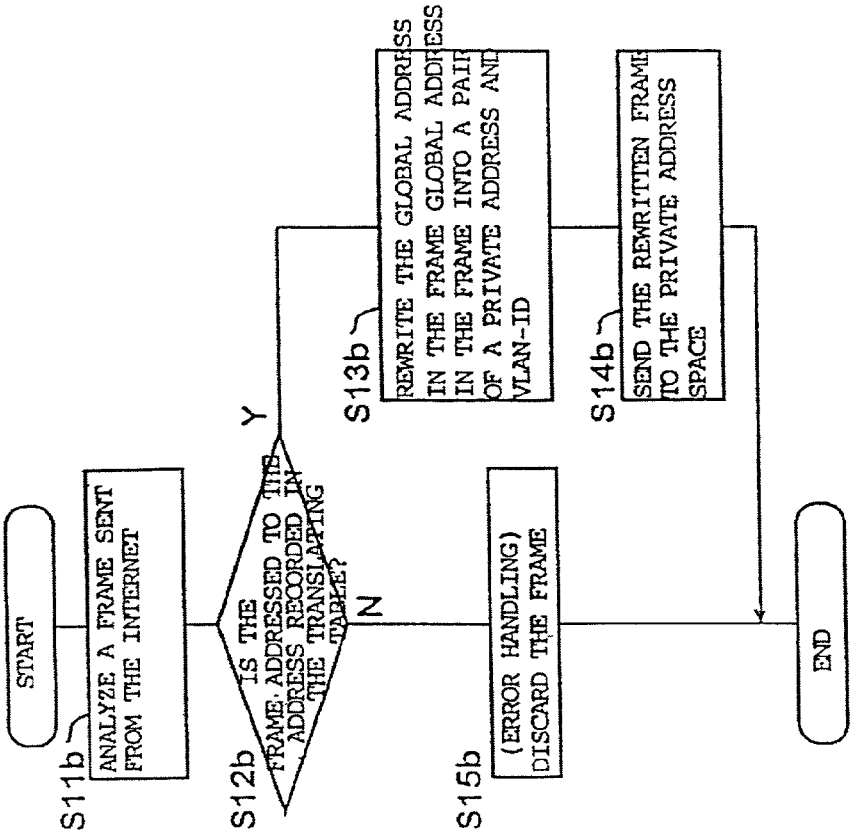
FIG. 3A and FIG. 3B are flowcharts showing operations of Example 1.
Figure 3B:
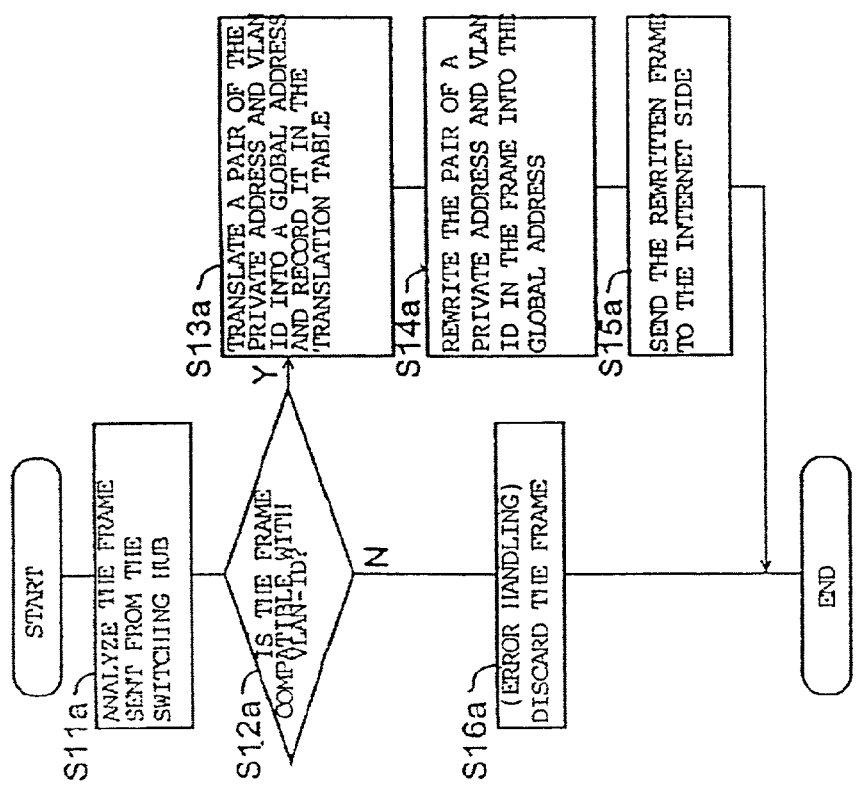

FIG. 3A and FIG. 3B are flowcharts showing operations of Example 1.

FIG. 3A shows operations when translation from private address space 1 into the Internet 2 is performed and FIG. 3B shows operations when translation from the Internet 2 into the private address space 1 is performed.

When a frame is sent from the private address space 1 side to the Internet 2 side, as shown in FIG. 3A, the duplicate address translating device 11 analyzes the frame sent from the switching hub 12 (Step S11a). If the frame corresponds to a VLAN-ID, the duplicate network address translating device 11 records a combination of the private addresses and VLAN-IDs in the translation table for translation into a corresponding global address (Step S12a to Step S13a).

FIG. 4 is an explanatory diagram of the translating tables.

As illustrated, global addresses have been determined in advance for combinations of private addresses and additional information (VLAN-IDs). In addition, fields to indicate port numbers also exist in these translation tables. This is a widely known technique that is used when the number of available global addresses is less than that of private addresses (in many cases, one global address is used). This technique performs mutual translation based on the combination of an IP address+a port number and is referred to as NAPT (Network Address Port Translation) or IP masquerade.

Then, the destination address (private address) is rewritten to the global address (address of the duplicate network address translating device 11), the VLAN-ID compatible frame is translated into a normal frame (Step S14a), and this frame is sent to the Internet 2 side (Step S15a). On the other hand, if the frame does not correspond to VLAN-ID, this frame is discarded (Step S16a). This is one of the error handling packaging methods and other error handling methods may be carried out.

Contrary to the above-described case, when a frame returns from the Internet 2 side to the private address space 1 side as shown in FIG. 3B, the frame returns to the global address (the address of the duplicate network address translating device 11) that has been rewritten by the above-described operations (Step S11b). Herein, first, the duplicate network address translating device 11 collates the translation table shown in FIG. 4 with the frame (Step S12b). If the address of this frame is the same as the address recorded in the translating table, a judgement that the frame is addressed to the address set in the translating table is made and the process is continued. In this case, by collating the collating table in reverse, a combination of the private addresses and VLAN-IDs that correspond to the global address is determined. Based on this information, the destination address in the frame (global address) is rewritten to a private address and the frame is translated into a VLAN-ID compatible frame, and a value that has been recorded in the translating table is set as the VLAN-ID value (Step S13b). Then, this frame is sent to the private address space 1 side (Step S14b).

In addition, if the frame is not addressed to the address recorded in the translating table in Step S12b, this frame is discarded (Step S15). Similar to Step S16a, this is also one of the error handling packaging methods and other error handling methods may be carried out.

Figure 5:
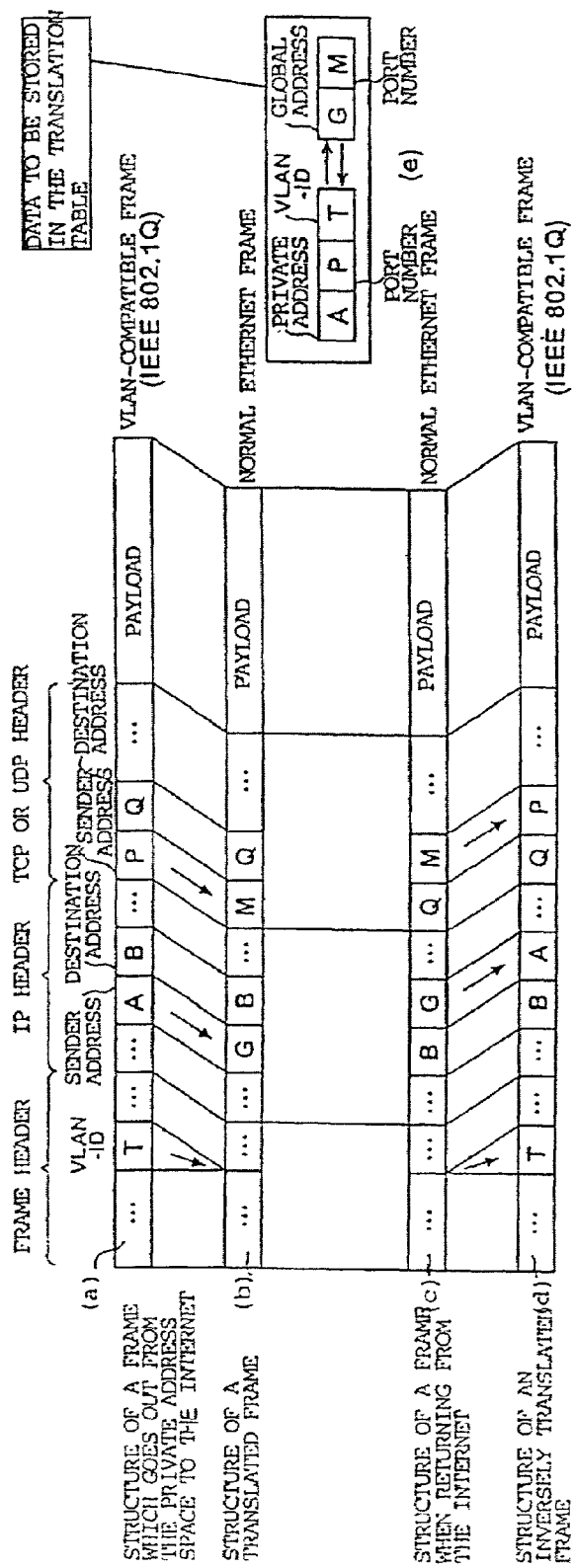
FIG. 5 is an explanatory diagram of frame conditions of Example 1.

FIG. 5 is an explanatory diagram of frame conditions of the above operations.

First, a construction of a frame which is sent from the inside of the private address space 1 via switching hub 12 to the duplicate network address translating device 11 is as shown by (a) in the drawing. That is, where VLAN-ID indicating a private address space 1 is provided as T, the address and communications port of the apparatus are provided as A and P, respectively, and the destination address and communications port are provided as B and Q, respectively, the respective values are stored in appointed places of a frame header, an IP header, and a TCP or UDP header.

Then, such a frame is translated by the duplicate network address translating device 11 as shown by (b) in the drawing. Details of the translation are as follows.

- The destination address A in the IP header is rewritten to a global address G that is given to the duplicate network address translating device 1.
- The destination port number of the TCP or UDP header is rewritten to a port number M that is "unused" at the moment for the duplicate network address translating device 11. Herein, if there is no vacancy in the port numbers (if loads are momentarily concentrated to the duplicate network address translating device 11), a translating process is not performed and the frame is discarded.
- When performing the above translation, the information before and after the translation is recorded in the translating table (shown by (e) in the drawing). Herein, a point different from a conventional NAPT process is that the VLAN-ID value T is also recorded as the information of the private address space 1 side.
- Lastly, after the 802.1Q-compatible frame is translated into a normal Ethernet frame, the frame is sent to the Internet 2 side.

When the frame, that was sent by the above-described translation, returns from the communications partner, it is addressed to and reaches the duplicate network address translating device 11 in a form with the addresses and port numbers of the destination and sender being replaced with each other, respectively (see (c) in the drawing).

For this frame, the duplicate network address translating device 11 performs translation, that is the reverse of "going", by making reference to the translating table, constructs a frame (d) of the drawing, and forwards the frame to the private address space 1 side. Herein, since the VLAN-ID values are also correctly restored, the frame can be correctly sent even to apparatuses whose VLAN-IDs are different and private address values are identical.

In Example 1 as described above, a case where each apparatus in the private address space 1 can interpret the 802.1Q-compatible frame, even when each apparatus in the private address space 1 is a normal apparatus (that cannot interpret the 802.1Q-compatible frame), if the apparatus has a gateway to translate the normal frame into an 802.1Q-compatible frame, operations similar to those of Example 1 can be performed. Hereinafter, this case will be described as a modification of Example 1.

Figure 6:
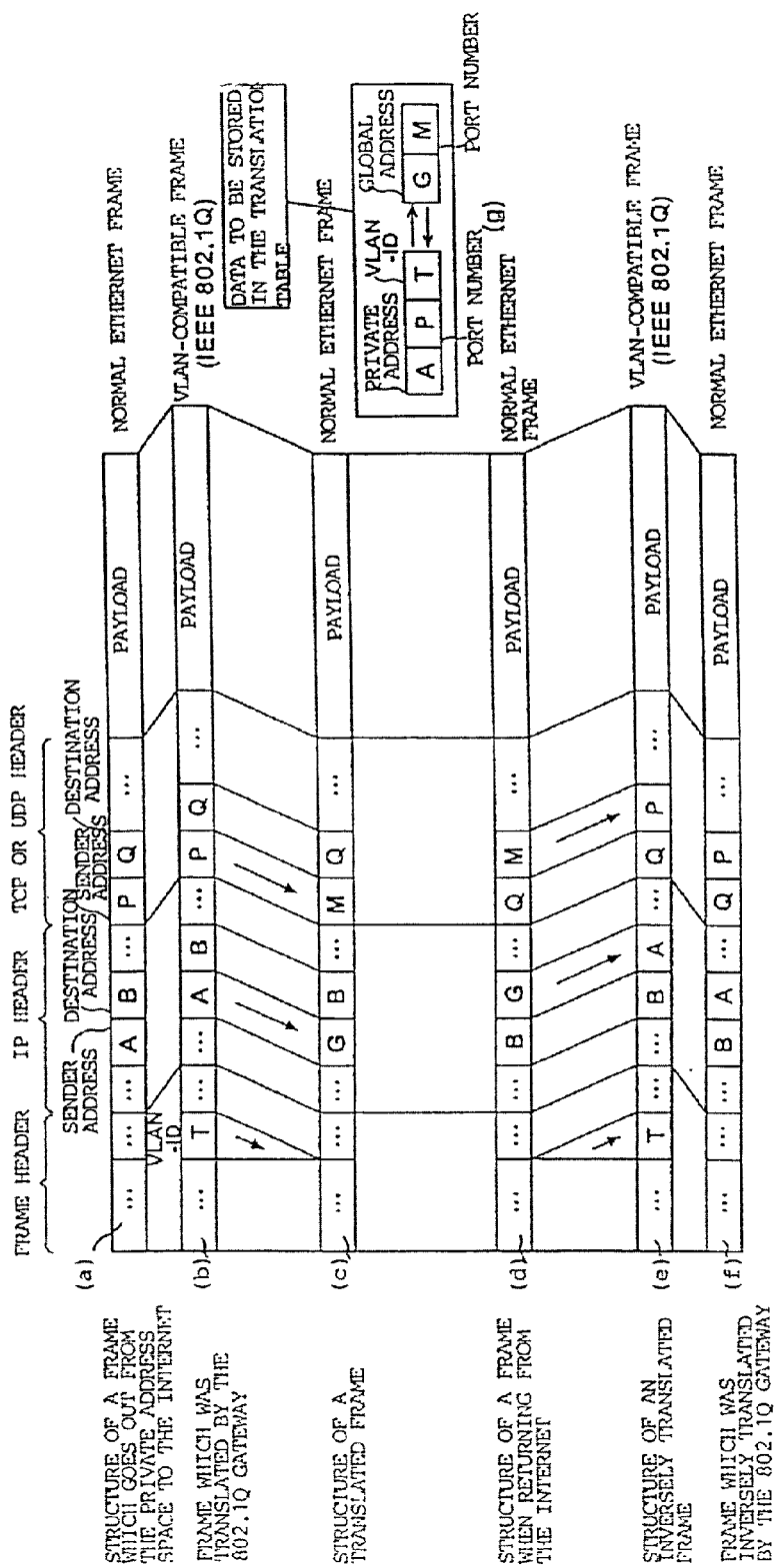
FIG. 6 is an explanatory view of frame conditions of a modification of Example 1.

FIG. 6 is an explanatory view of frame conditions of a modification of Example 1.

In this case, for example, in terms of the construction of FIG. 1, a gateway to translate a normal frame into an 802.1Q-compatible frame is provided between each private address space 1 and switching hub 12. As such a gateway, a widely known gateway can be used.

First, a frame which exits from each apparatus in the private address space 1 is in a condition as shown by (a) in FIG. 6. When an arbitrary apparatus in this private address space enters into correspondence with another private address space 1, it is necessary to perform translation into an 802.1Q-compatible frame having a VLAN-ID value T that represents the applicable private address space 1 and the VLAN-ID value of the above gateway plays this role. This frame translated by the gateway is the frame shown by (b) in the drawing, and the subsequent operations in frame conditions shown by (c) through (e) in the drawing and contents of the translating table shown by (g) are similar to the above case of FIG. 5.

In addition, as shown by (e) in the drawing, the frame created by translating the frame returned from the Internet 2 side by means of the duplicate network address translating device 11 is also an 802.1Q-compatible frame, and reversal translation thereof into a normal frame is also a role of the above gateway. Thus, even in the case of a normal apparatus in the private address space, mutual translation of addresses can be performed between private address spaces 1 where overlap exists and Internet 2.

<Effects>

As has been described above, according to Example 1, by using information concerning a combination of identification information for identifying the private address spaces 1 and private addresses, mutual translation between the private address and global address is performed, whereby it becomes possible to connect a plurality of private address spaces 1 where overlap of private addresses possibly exists can be connected to the global address space. In addition, since the VLAN-IDs are used as identification information, special identification information is unnecessary in the networks where VLANs are constructed and costs for connecting with the global address space can be suppressed.

EXAMPLE 2

Example 2 is an example which is effective when a plurality of private address spaces, that have been connected to an MPLS network, are further connected to a global address space such as the Internet. That is, in Example 2, an MPLS router-cum-network address translating device that is provided in the MPLS network is used as an address translating means 20.

<Construction>

Figure 7:
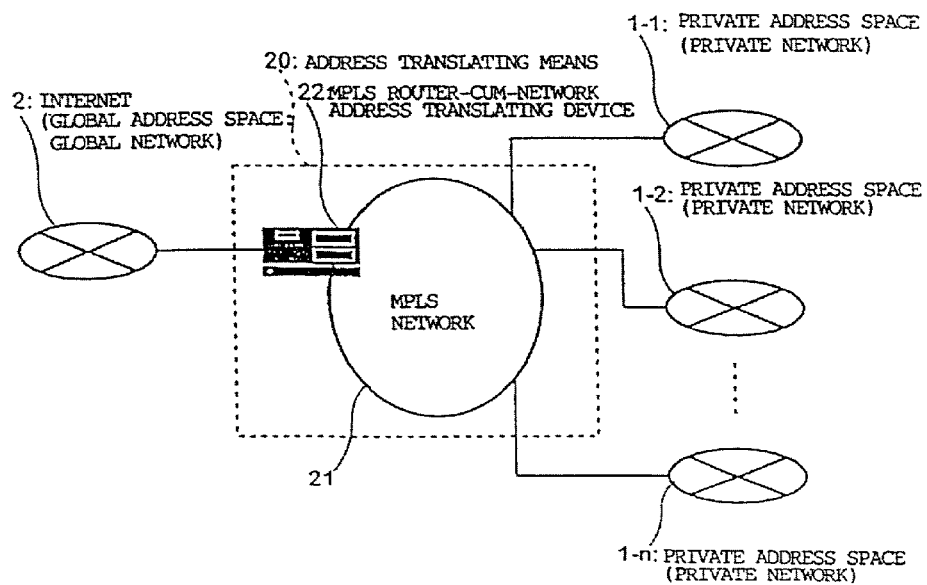
FIG. 7 is a constructional diagram of Example 2.

FIG. 7 is a constructional diagram of Example 2.

In the drawing, 1-1, 1-2, . . . , and 1-n denote private address spaces (private networks), respectively, and these private address network spaces 1-1, 1-2, . . . , and 1-n are connected to the global address space (Internet) 2 via an address translating means 20. Herein, each private address network spaces 1 and the Internet 2 are same as those of Example 1.

An MPLS network 21 of the address translating means 20 uses a frame with an MPLS label, an MPLS edge router, whose illustration is omitted, performs switching based on this label in the network, and performs, when entering the MPLS network 21 from the outside, insertion of the MPLS label into a normal frame and, when exiting from the MPLS network 21, deletion of the label, respectively.

The MPLS router-cum-network address translating device 22 has a function to perform mutual translation between a private address and a global address by means of the MPLS label in a frame, and is provided with a translating table (not illustrated) for such mutual translation.

Figure 8:
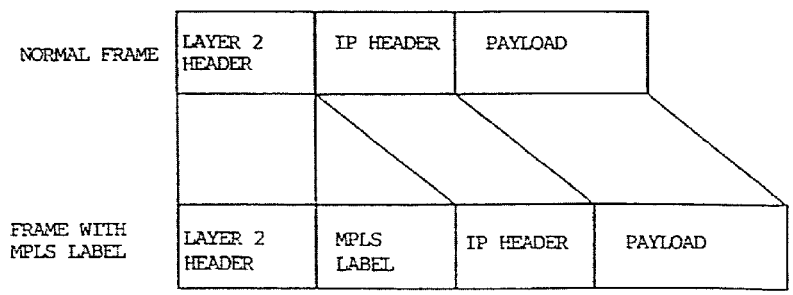
FIG. 8 is an explanatory diagram of the MPLS frame of Example 2.

FIG. 8 is an explanatory diagram of the MPLS frame.

As illustrated, a 32-bit long MPLS label is inserted in an MPLS frame. This MPLS label is identification information indicating which group the terminal belongs to in the MPLS network 21 and an MPLS edge router, whose illustration is omitted, and the MPLS router-cum-network address translating device 22 perform routing based on the MPLS label. Thus, even between different networks, communications having the same MPLS label can be treated as if they were an identical network.

<Operations>

Hereinafter, operations of Example 2 will be described.

Figures 9A, 9B:
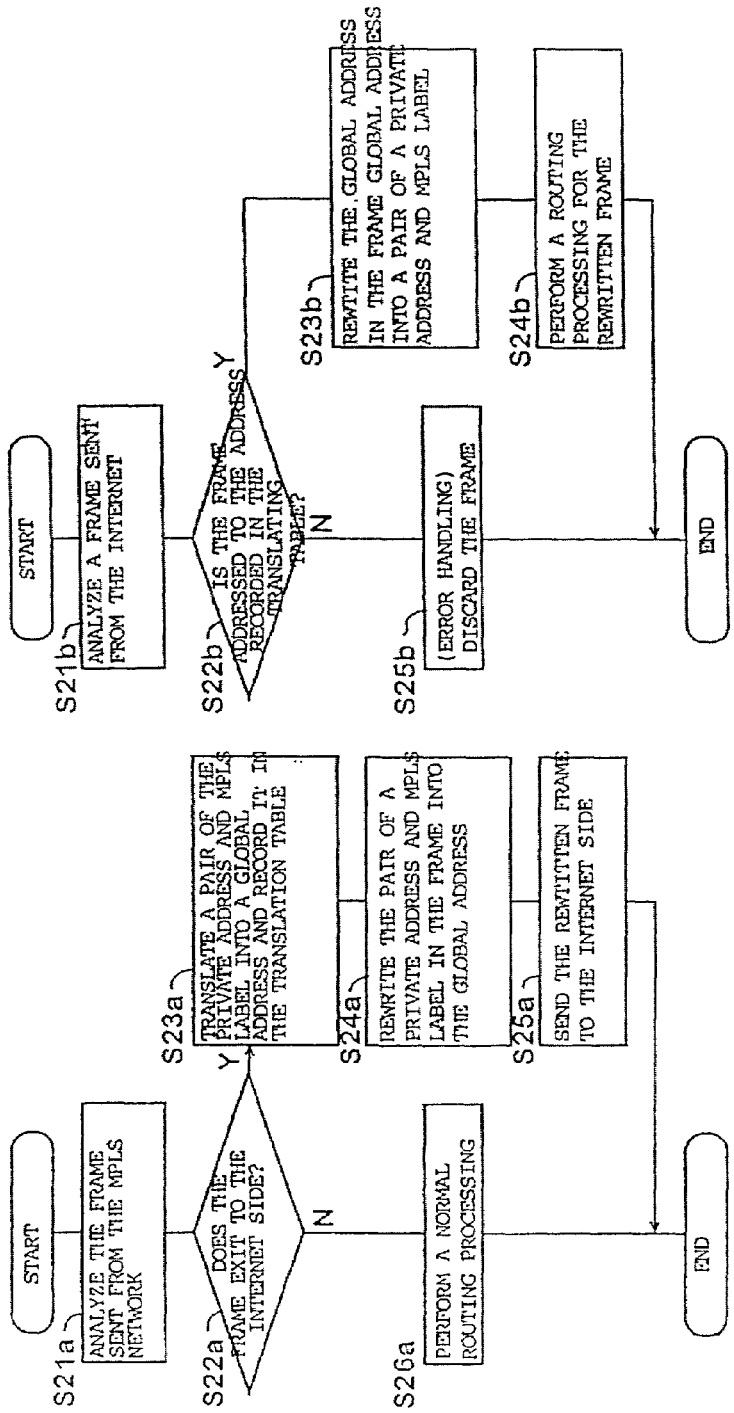
FIG. 9A and FIG. 9B are flowcharts showing operations of Example 2.

FIG. 9A and FIG. 9B are flowcharts showing operations of Example 2.

FIG. 9A shows operations when performing translation from the private address space 1 into the Internet 2 and FIG. 9B shows operations when performing translation from the Internet 2 to the private address space 1.

When sending a frame from the private address space 1 side to the Internet 2 side via the MPLS network 21, as shown in FIG. 9A, the MPLS router-cum-network address translating device 22 analyzes the frame sent from the MPLS network 21 (Step 21a). If the frame is to exit toward the Internet 2 side, a combination of the private address and MPLS label is recorded in the translating table for translation into a corresponding global address (Step S22a to Step S23a).

Figure 10:
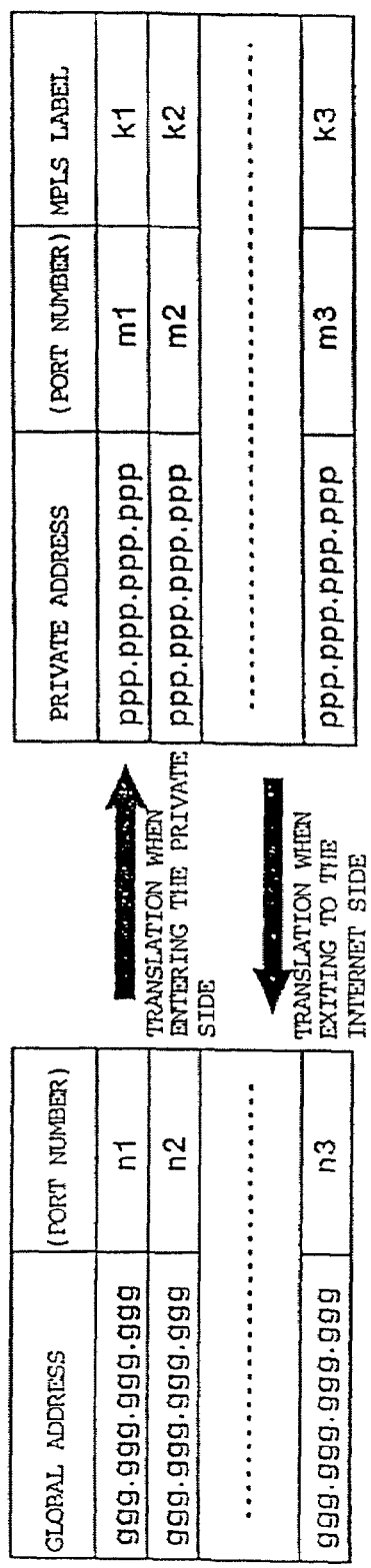
FIG. 10 is an explanatory diagram of the translating tables of Example 2.

FIG. 10 is an explanatory diagram of the translating tables.

As illustrated, a global address has been determined in advance with respect to the combination of a private address and additional information (MPLS label). Furthermore, fields representing port numbers also exist in these translating tables, however, similar to Example 1, this is a widely known technique that is used when the number of available global addresses is less than the number of private addresses.

Then, the sender's address in the frame (private address) is rewritten to a global address (the address of the MPLS router-cum-network address translating device 22) and furthermore, the frame is translated into a normal frame by deleting the MPLS label (Step S24), and this frame is sent to the Internet (Step S25a) side. On the other hand, when the frame is not a frame to exit toward the Internet 2 side in Step S22, the MPLS router-cum-network address translating device 22 performs a normal routing process (Step S26a).

Contrary to the above case, when the frame returns from the Internet 2 side to the private address space 1 side, the frame is addressed to and returns to the global address (the address of the MPLS router-cum-network address translating device 22) that has been rewritten through the above operations (Step S21b). Herein, first, the MPLS router-cum-network address translating device 22 performs collation between the translation table and frame shown by FIG. 10 (Step S22b). If the address of this frame is identical to the address recorded in the translating table, a judgement that the frame is addressed to the address that has been set in the translating table by the above processes is made, and the process is continued. In this case, by referring to the translating table in reverse, a combination of the private address and MPLS label which corresponds to the global address is determined. Based on this information, the destination address (global address) in the frame is rewritten to a private address (Step S23b). Furthermore, after inserting an MPLS label into the frame, a normal routing process is performed as an MPLS router for this frame (Step S24b).

In addition, in step S22b, if the frame is not addressed to the address recorded in the translating table, this frame is discarded (Step S25b). This is one of the error handling packaging methods and other error handling methods may be carried out.

Figure 11:
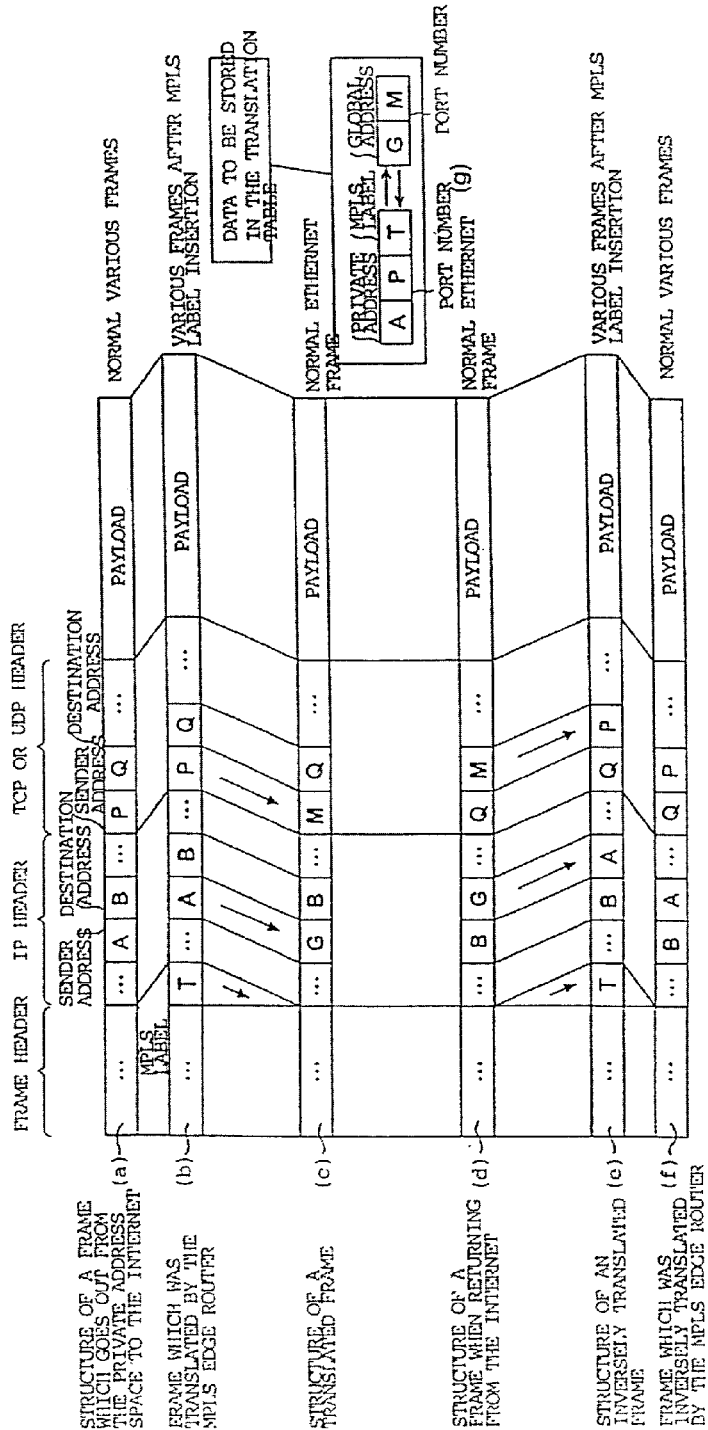
FIG. 11 is an explanatory diagram of frame conditions of Example 2.

FIG. 11 is an explanatory diagram of frame conditions.

First, in the private address space 1, a frame construction thereof is as shown by (a) in the drawing. When an apparatus in this space enters into correspondence with the Internet 2, first, the frame is passed to an MPLS edge router, whose illustration is omitted. Now, an MPLS label is inserted and translation is performed as shown by (b) in the drawing. This frame is routed up to the MPLS router (MPLS router-cum-network address translating device 22) that is a connection point with the Internet 2, based on the MPLS label. Then, the MPLS router-cum-network address translating device 22 translates the condition (b) of the frame into the condition (c). Such translation is almost similar to that of Example 1, however, details of the translation are as follows.

The sender's address A in the IP header is rewritten to a global address G given to the MPLS router-cum-network address translating device 22.

The destination port number of the TCP or UDP header is rewritten to a port number M that is "unused" at the moment of the MPLS router-cum-network address translating device 22. Herein, if there is no vacancy in the port numbers (if loads are momentarily concentrated to the MPLS router-cum-network address translating device 22), a translating process is not performed and the frame is discarded.

When performing the above translation, the information before and after the translation is recorded in the translating table (shown by (g) in the drawing). Herein, a point different from a conventional NAPT process is that the MPLS label value T is also recorded as the information of the private address space 1 side.

Lastly, after the frame with the MPLS label inserted is translated into a normal Ethernet frame, the frame is sent to the Internet 2 side.

The frame sent through the above translation is, when returning from the communications partner, addressed to and reaches an MPLS router-cum-network address translating device 22 in a form with the addresses and port numbers of the destination and sender being replaced with each other, respectively (see (d) in the drawing).

For this frame, the MPLS router-cum-network address translating device 22 performs translation, that is the reverse of "going", by making reference to the translating table, constructs a frame (e) of the drawing, and performs routing based on the MPLS label. Herein, since the MPLS label values are also correctly restored, the frame can be correctly sent even to apparatuses whose MPLS label values are different and private address values are identical.

Lastly, when a frame returns from the MPLS edge router to the private address space 1, the frame with the MPLS label is translated into a normal frame then sent to the private address space 1 side. That is, frame (e) is translated into the frame (f) in the drawing.

<Effects>

As has been described above, according to Example 2, similar to Example 1, it becomes possible to connect a plurality of private address spaces 1 where overlap of private addresses possibly exists can be connected to the global address space.

In addition, if an MPLS network has been already proved on the VPN carrier side, this MPLS network can be utilized, therefore there is an effect in that less equipment suffices for connection with the global address space.

EXAMPLE 3

According to Example 3, an edge router of the MPLS network is utilized, the duplicate network address translating device of Example 1 is connected therewith, and the duplicate network address translating device is connected to a global address space.

<Construction>

Figure 12:
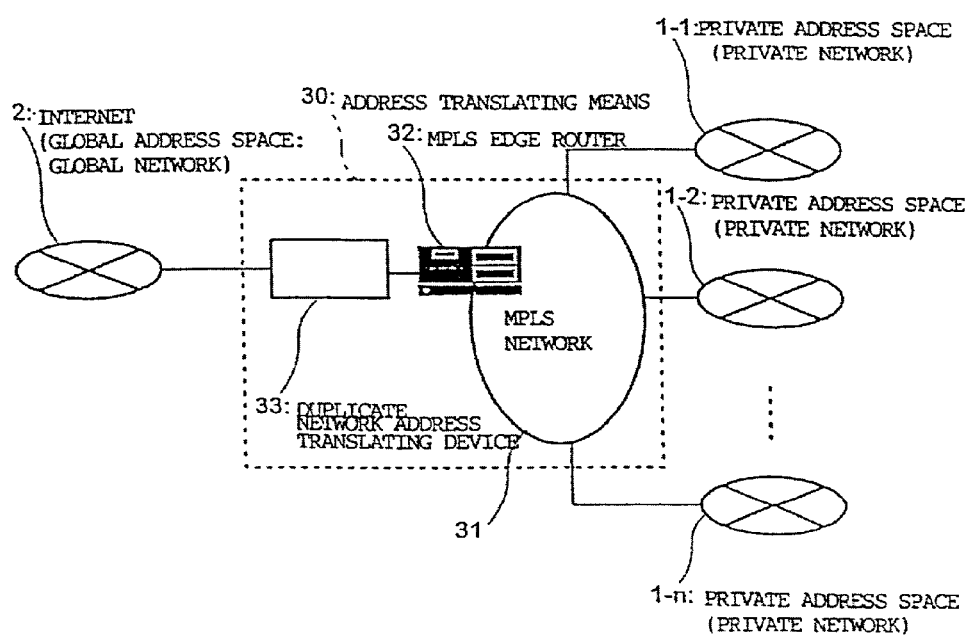
FIG. 12 is a constructional diagram of Example 3.

FIG. 12 is a constructional diagram of Example 3.

In the drawing, 1-1, 1-2, . . . , and 1-n denote private address spaces, respectively, and these private address network spaces 1-1, 1-2, . . . , and 1-n are connected to the global address space (Internet) 2 via an address translating means 30. Herein, each private address network spaces 1 and the Internet 2 are same as those of Examples 1 and 2.

Herein, a point different from Example 2 is that a duplicate network address translating device 33 is installed as an apparatus independent of an MPLS edge router 32. That is, an MPLS network 31 of Example 3 has almost the same construction as that of the MPLS network 21 of Example 2, however, when sending a frame from the MPLS network 31 to the duplicate network address translating device 33, it is possible to translate the frame with an MPLS label into a frame having a VLAN-ID compatible header as shown in FIG. 2 of Example 1 for sending. In addition, a function is provided such that conversely, the VLAN-ID compatible frame that is sent from the duplicate network address translating device 33 is translated into a frame with an MPLS label. As the MPLS edge router 32 which performs such mutual translation between the frame with an MPLS label and 802.1Q-compatible frame, a widely known MPLS edge router can be used. Moreover, the duplicate network address translating device 33 has a similar construction as that of the duplicate network address translating device 11 of Example 1.

<Operations>

Hereinafter, operations of Example 3 will be described. Since the basic operations of the duplicate network address translating device 33 are similar to those of Example 1, those operations will be omitted, and only frame translation will be described.

Figure 13:
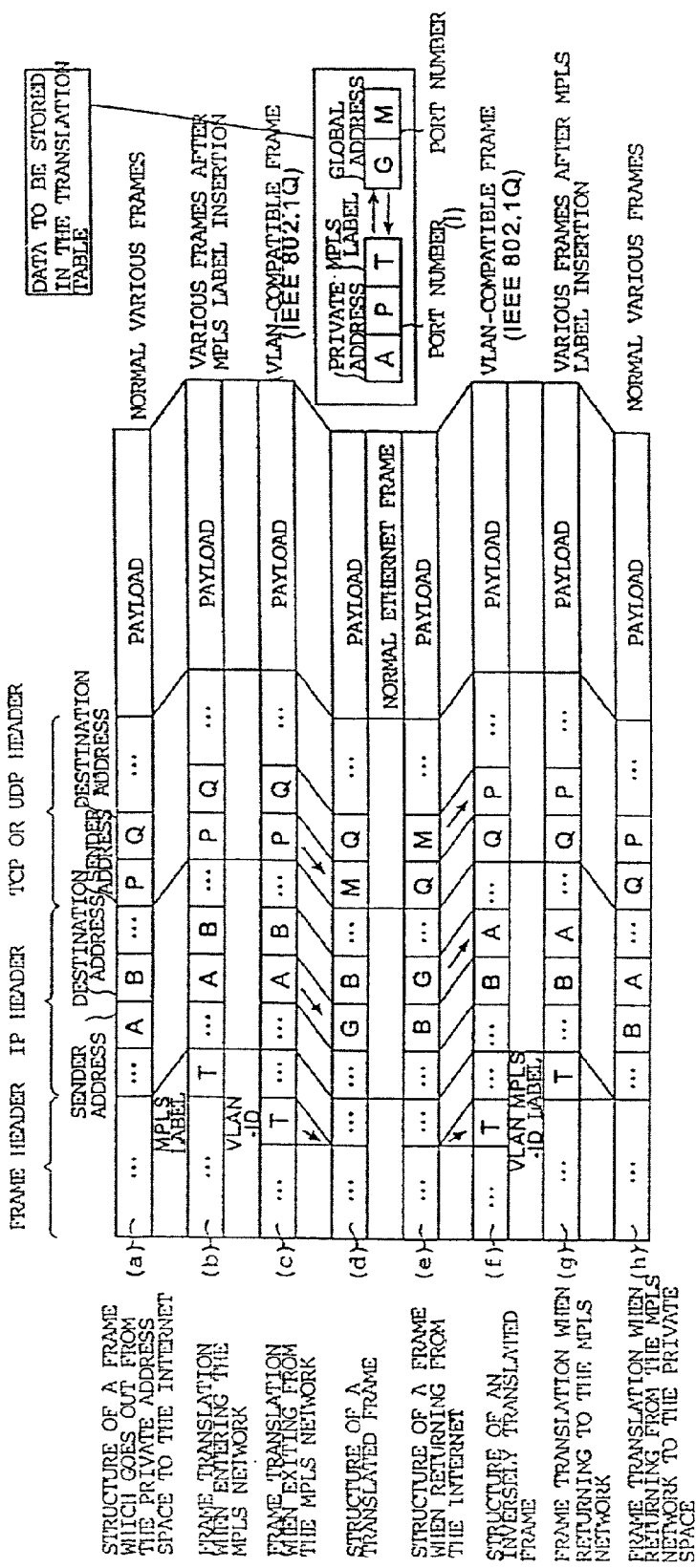
FIG. 13 is an explanatory diagram of frame conditions of the respective portions of Example 3

FIG. 13 is an explanatory diagram of frame conditions of the respective portions of Example 3.

First, in the private address space 1, a frame construction thereof is as shown by (a) in the drawing. When an apparatus in this space enters into correspondence with the Internet, first, the frame is passed to an MPLS edge router, whose illustration is omitted, provided between the private address space 1 and MPLS network 31. Now, an MPLS label is inserted and translated as shown by (b) in the drawing. This frame is routed up to the MPLS edge router 32, that is a connection point with the Internet 2, based on the MPLS label (the operations thus far are similar to those of Example 2). Then, the MPLS edge router 32 translates the frame with an MPLS label into an 802.1Q compatible frame, then sends it to the duplicate network address translating device 33 side. At this time, the MPLS edge router 32 translates the condition (b) of the frame into the condition (c). Hereinafter, translating processes in the duplicate network address translating device 33 are similar to those of Example 1 (See (d) in the drawing).

The frame sent through the above translation is, when returning from the communications partner, addressed to and reaches a duplicate network address translating device 33 in a form with the addresses and port numbers of the destination and sender being replaced with each other, respectively (see (e) in the drawing).

For this frame, the duplicate network address translating device 33 performs translation, that is the reverse of "going", by making reference to the translating table, constructs a frame (f) of the drawing, and sends the frame to the MPLS edge router 32 side. In the MPLS edge router 32, a frame with an MPLS label is reconstructed from the 802.1Q compatible frame and performs routing based on the MPLS label. The frame obtained by this reconstruction is shown by (g) in the drawing. Herein, since the VLAN-ID values to the MPLS label values are also correctly restored, the frame can be correctly sent even to apparatuses whose MPLS label values are different and whose private address values are identical.

Lastly, when a frame returns from the MPLS edge router to the private address space 1, the frame with the MPLS label is translated into a normal frame then sent to the private address space 1 side. That is, the frame (g) is translated into the frame (h) in the drawing.

<Effects>

As has been described above, according to Example 3, in addition to the effects of Example 2, the following effects are provided. That is, in Example 3, if an MPLS network is provided on the VPN carrier side, the MPLS edge router 32 can also utilize existing equipment. In such a case, the duplicate network address translating device 33 is appropriately prepared as equipment for connecting the private address space 1 to the Internet 2, and accordingly, the carrier and the like which have already provided VPN services can suppress the total cost to a minimum.

In the above examples, the VLAN-ID and MPLS label are used as information to identify the private address space 1, however, identification information is not limited to such information and any information can be applied as long as it is unique to each private address space 1.

In addition, in the above examples, the IP addresses have been employed as addresses based on a specific protocol, however, the present invention is not limited hereto and any protocol can be applied as long as arbitrary addresses are used in networks.

Now, an embodiment of the network system according to the present invention will be described in detail by means of examples.

EXAMPLE 1

<Construction>

Figure 14:
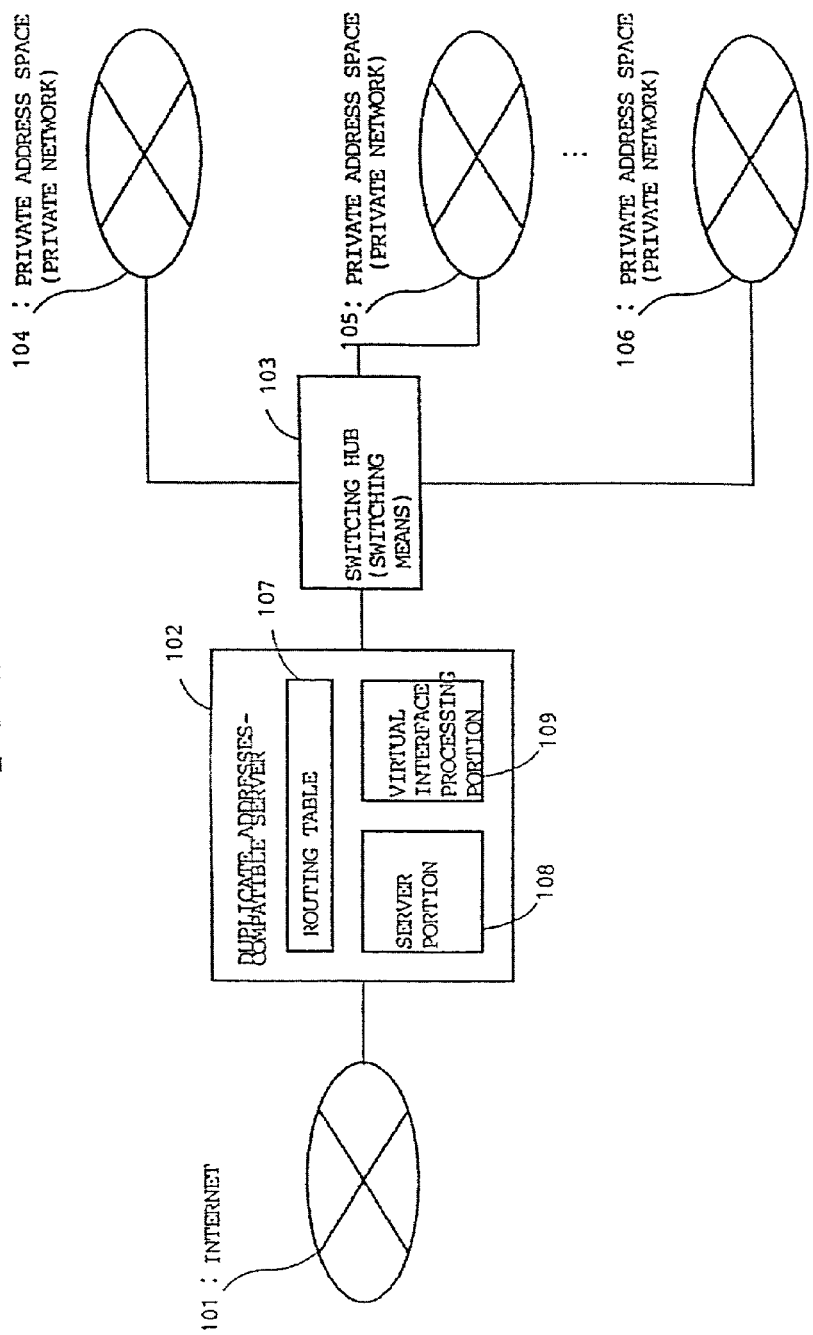
FIG. 14 is a constructional diagram showing Example 1 of the duplicate address network system according to the present invention.

FIG. 14 is a constructional diagram showing Example 1 of the duplicate private address translating system according to the present invention.

The illustrated network system comprises Internet 101, duplicate addresses-handling server 102, switching hub (switching means) 103, and private address spaces 104, 105, and 106.

The Internet 101 is a global address space to which a unique IP address is given.

Private address spaces 104, 105, and 106 are private address spaces (private networks), respectively, and these private address network spaces 104, 105, and 106 are connected to the Internet 101 (global address space) via a switching hub 103 and a duplicate addresses-handling server 102. In the following examples, these private address network spaces 104, 105, and 106 and the Internet 101 are regarded as IP address spaces.

In the respective private address spaces 104, 105, and 106, addition of an arbitrary private address is permitted and as a result, there is a possibility that overlap of IP addresses occurs in the different private address spaces. Hereinafter, for convenience of explanation, the respective private address spaces 104, 105, and 106 all have the same network address of 192.168.1.0/24.

Furthermore, in each of private address space 104, 105, and 106, V(virtual)LAN of IEEE802.1Q-compatible frames is constructed. According to this VLAN, a virtually identical LAN is realized between different networks by using VLAN tags in frame headers (which will be described later).

Figures 15, 16:
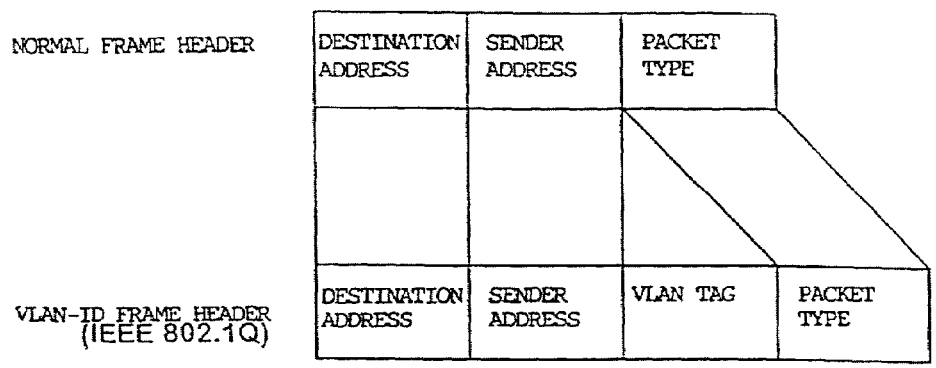
FIG. 15 is an explanatory diagram of the VLAN-ID compatible frame header.
FIG. 16 is an explanatory diagram of the routing table.

FIG. 15 is an explanatory diagram of the VLAN-ID compatible frame header of Example 1.

As illustrated, a 32 bit-long VLAN tag (VLAN-ID) is added on the heels of a destination address and a sender's address. This VLAN tag is identification information indicating which group the terminal belongs to in the VLAN, and a switching hub 103 performs switching based on the VLAN tag. Thus, even between different networks, a LANs can be handled as if they were an identical LAN. In addition, in FIG. 14, the respective address spaces 104, 105, and 106 correspond to the respective VLAN groups.

Returning to FIG. 14, the switching hub 103 is a VLAN-ID compatible switching means which is connected to the respective private address spaces 104, 105, and 106 and can interpret a frame compatible with the IEEE802.1Q standards and perform a switching process.

The duplicate addresses-handling server 102 is a server which receives a request from a client of private address space 104, 105, and 106 via the switching hub 103 and makes a response to the request, and is provided as a proxy server in the present example. This duplicate addresses-handling server 102 includes a routing table 107, a server portion 108, and a virtual interface processing portion 109. The routing table 107 is a table showing the relationship between the network address of the respective private address spaces 104, 105, and 106 and a predetermined virtual interface and is constructed as follows.

FIG. 16 is an explanatory diagram of the routing table.

Herein, the destination is a network address of the respective private address space 104, 105, and 106, the interface indicates a virtual interface between the server portion 108 and virtual interface processing portion 109, and vlan004, vlan005, and vlan006 in the drawing are provided as etho virtual interfaces for VLAN-ID=104, 105, and 106, respectively. Namely, there is a characteristic in that a plurality of entries having the same destination and different output interfaces exist in each different VLAN-ID.

The server portion 108 is a function portion which performs a proxy process of the duplicate addresses-handling server 102, wherein VLAN-IDs and virtual interfaces are related beforehand, if an arbitrary request is made from an apparatus in any network, the request and identification information attached to the request is stored, if a response to the request is made, reference to the routing table 107 is made, a virtual interface such that a network address of the response receiver coincides with the virtual interface which is related to the identification information is selected, and a response is sent to the virtual interface.

The virtual interface processing portion 109 is a function portion which performs a layer 2 process of an OSI reference model of the duplicate addresses-handling server 102, is provided with a plurality of virtual interfaces as receiving ports of data from the server portion 108, and has a function, when receiving response data from any virtual interface, to add a VLAN-ID that has been related to the interface in the routing table 107 thereto and send the response data to the switching hub 103.

<Operations>

Hereinafter, operations of Example 1 will be described.

Figures 17A, 17B:
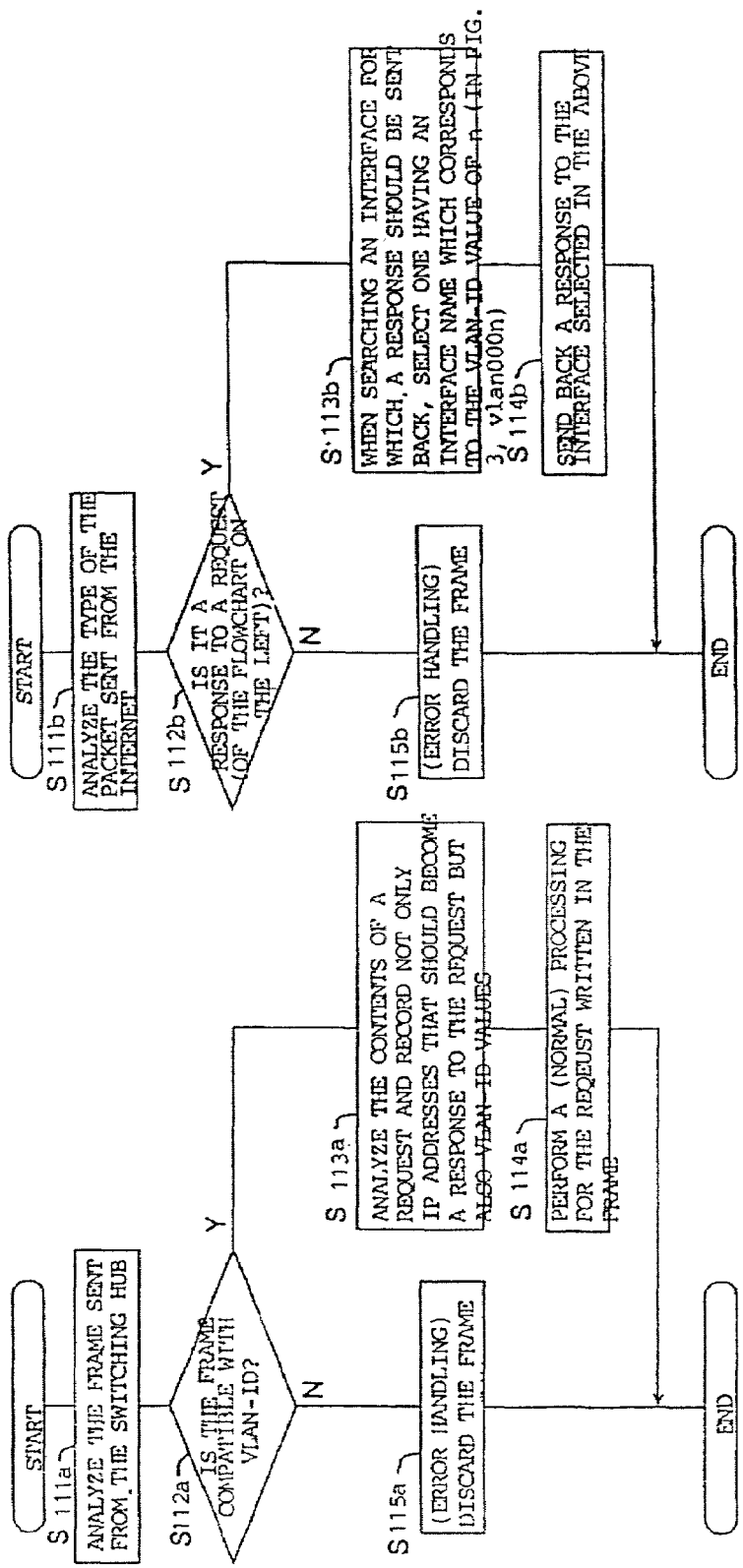
FIG. 17A and FIG. 17B are flowcharts showing operations of Example 1.

FIG. 17A and FIG. 17B are flowcharts showing operations of Example 1.

FIG. 17A shows operations when accepting requests from the private address spaces 104, 105, and 106, and FIG. 17B shows operations when making responses to these private address spaces 104, 105, and 106.

A service request including an HTTP request from the private address spaces 104, 105, and 106 side is sent to the duplicate addresses-handling server 2 via the switching hub 3. The server portion 108 of the duplicate addresses-handling server 102 analyzes this request (Step S111a) and records the analyzed request in the following table.

FIG. 18 is an explanatory diagram of such a table, that is, a correspondence table between request items and response receivers.

In the diagram, the "important item" is information to identify contents of a request and the "response receiver's IP address" is a private IP address of the apparatus as a requester. Furthermore, "additional information" is a VLAN-ID and, it is set so that as values thereof, 4, 5, and 6 are added to requests from private address spaces 104, 105, and 106.

Namely, the present example is characterized in that the server portion 108 of the duplicate addresses-handling server 102 records not only IP addresses that should become a response to requests from the respective private address spaces 104, 105, and 106 but also VLAN-ID values (Step S112a to Step S113a). Aspects other than the above are similar to those of the normal proxy process for the request and the server portion 108 acts as a proxy to send an HTTP request and the like to the Internet 1 side when necessary.

In addition, if the frame is not a VLAN-ID compatible frame in the step S112a, this is simply discarded (Step S115a). This is one error packaging method and not essential from the point of view of the present invention. The foregoing is a description of operations to accept requests from the private address spaces 104, 105, and 106 shown in FIG. 17A.

Now, responding operations to the private address spaces 104, 105, and 106 shown in FIG. 17B will be described.

When data as a response to the above request (an HTTP response to the duplicate addresses-handling server 102 from the Internet side 1 and the like) is readied, first, the server portion 108 of the duplicate addresses-handling server 102 performs collation with respect to the request/respond correspondence table shown in FIG. 5 (Steps S111b and S112b). If the response has been recorded in the request/respond correspondence table, a judgement that the response has been recorded in the table by the above requesting process is made, and the process is continued. In this case, by referring to both the response receiver's IP address and additional information (VLAND-ID) values that have been recorded in the request/response correspondence table, a correct output interface is elected from the routing table 107 shown by FIG. 16 by making use of the correspondence between the VLAN-values and interface names (Step S113b). That is, in this case, an interface name vlan000n corresponding to the VLAN-ID value of n is selected.

Subsequent operations are the same as those of a normal responding process and the server portion 108 sends back a response to the discovered output interface (Step S114b). Thus, the virtual interface processing portion 109 adds a corresponding VLAN-ID to the received virtual interface and sends it to the switching hub 103. Furthermore, if the frame is not a response frame to a substitutional process of FIG. 17A, this is simply discarded (Step S115b). Similar to the step 115a of FIG. 17A, this is also one of the error packaging methods and other error handling methods may be carried out.

<Effects>

As described above, according to Example 1, the routing table 107 showing the correspondence between the network address of the private address spaces 104, 105, and 106 and virtual interfaces that have been related to the VLAN-IDs is provided in the duplicate addresses-handling server 102, if a request is made from an apparatus of any of the private address spaces 104, 105, and 106, the private address and the VLAN-ID value of the apparatus are held, if a response to this request is made, a virtual interface which corresponds to the VLAN-ID value is determined by referring to the routing table 107, and the server portion 108 sends the response data to this virtual interface. Therefore, it becomes possible to provide a plurality of networks where overlap of addresses exist with server functions such as a proxy service and the like by one server.

EXAMPLE 2

According to Example 2, a pair of a private address and a VLAN-ID for identifying a private address space is translated by a NAPT (Network Address Port Translation) process and a server function is provided for the translated data.

<Construction>

Figure 19:
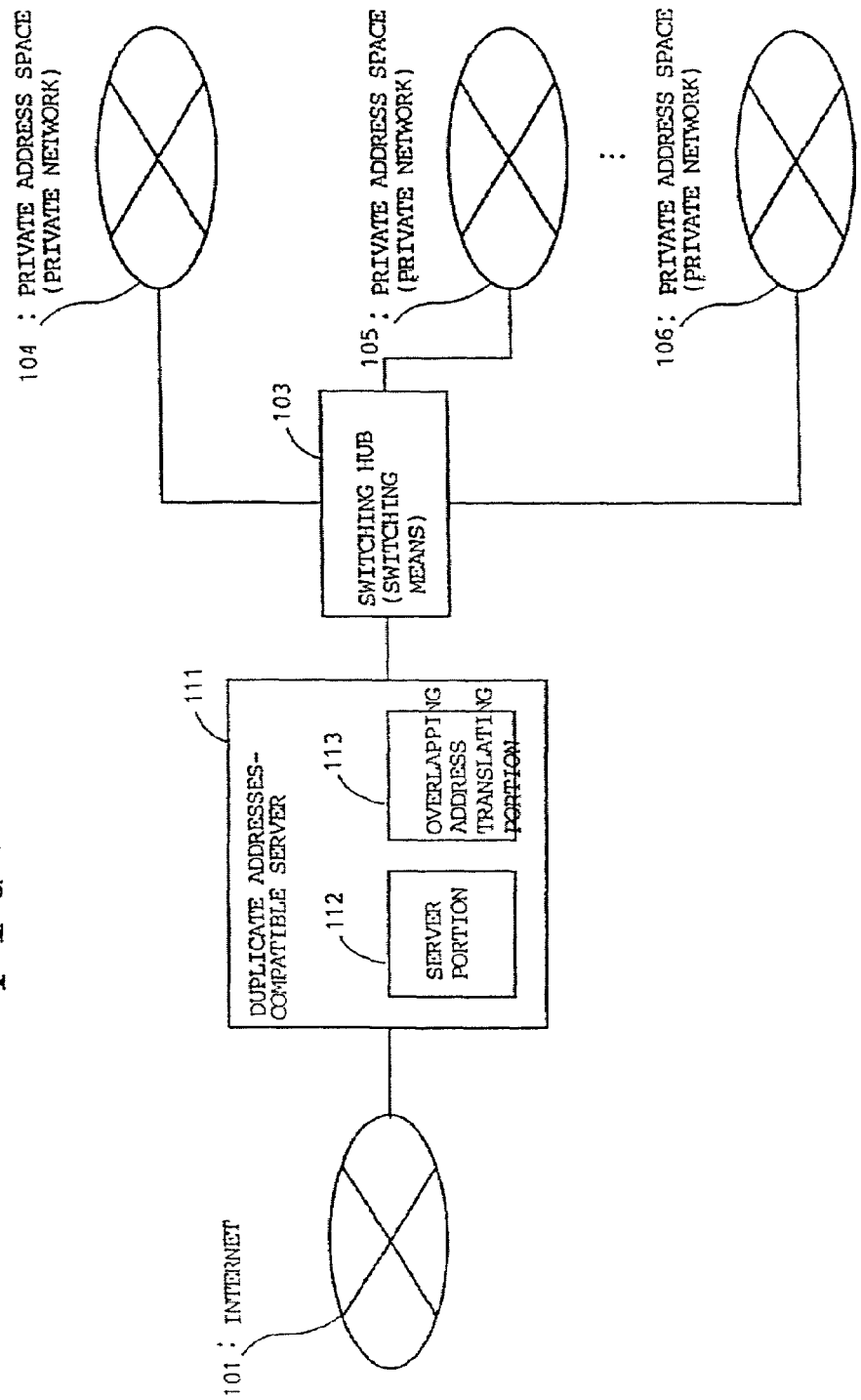
FIG. 19 is a constructional diagram of Example 2.

FIG. 19 is a constructional diagram of Example 2.

The illustrated network system comprises the Internet 101, the switching hub 103, the private address spaces 104, 105, and 106, and a duplicate addresses-handling server 111. Herein, the Internet 101, the switching hub 103, and the private address spaces 104, 105, and 106 are similar to those of Example 1, descriptions thereof will be omitted here.

Similar to Example 1, the duplicate addresses-handling server 111 is a proxy server which receives requests from clients (apparatuses) of the respective private address spaces 104, 105, and 106 and also makes responses to the requests, and comprises a server portion 112 and a duplicate address translating portion 113. The server portion 112 is a server having a proxy function and is constructed so as to accept requests from the respective address spaces 104, 105, and 106 via the duplicate address translating portion 113 and send response data to the requests to the duplicate address translating portion 113 with it's own private address and port number. The duplicate address translating portion 113 is a function portion which gives and receives data to and from the switching hub in the duplicate addresses-handling server 111 and performs the NAPT process between data of the switching hub 103 and data of the server portion 112. That is, the duplicate address translating portion 113 has a function to perform mutual translation between the combination of a VLAN-ID and a private address of the data received from the switching hub 103 and the combination of the private address of the server portion 112 and the respective different port numbers and is provided with a translating table for such mutual translation. This translating table will be described later.

<Operations>

Hereinafter, operations of Example 2 will be described.

Figure 20:
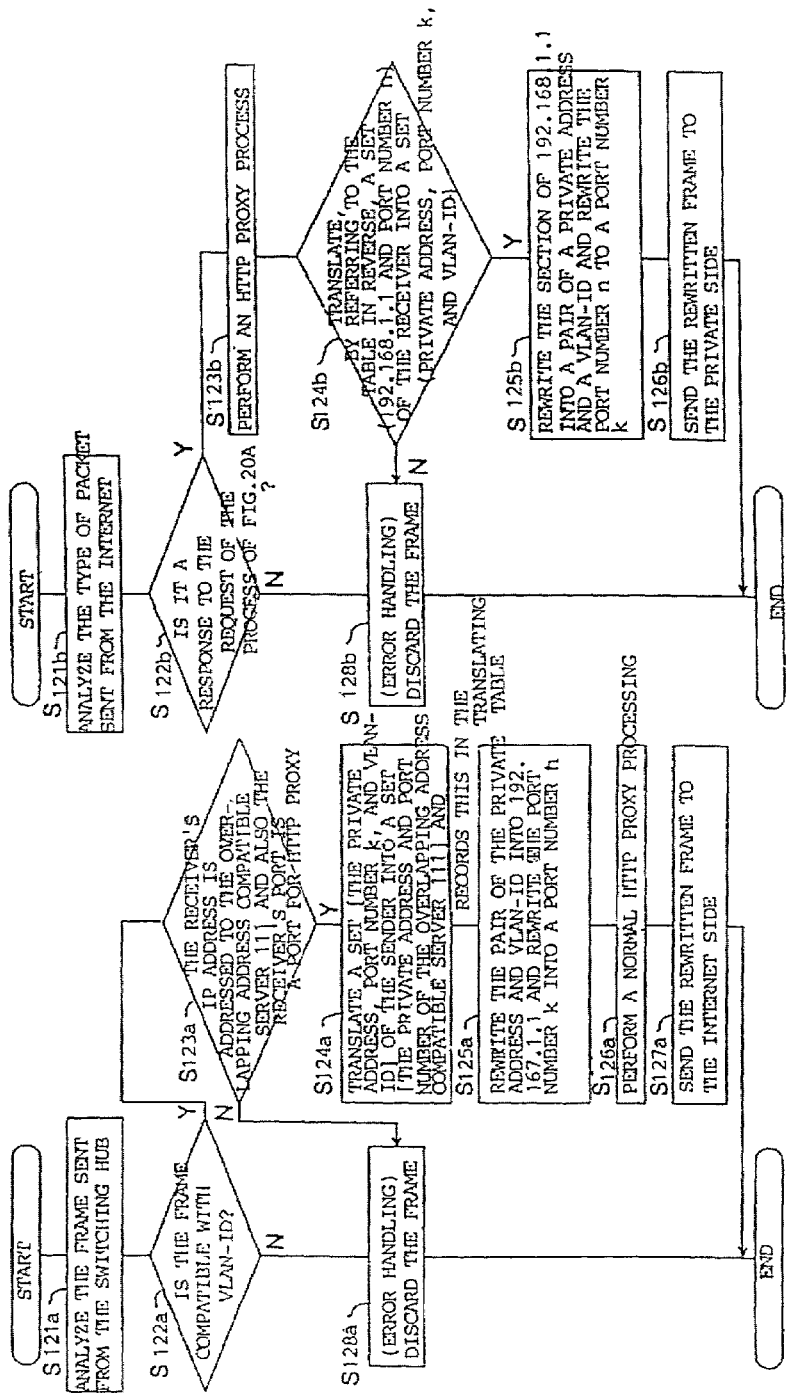
FIG. 20A and FIG. 20B are flowcharts showing operations of Example 2.

FIG. 20A and FIG. 20B are flowcharts showing operations of Example 2.

FIG. 20A shows operations when translation from the private address spaces 104, 105, and 106 to the Internet 101 is performed, and FIG. 20B shows operations when translation from the Internet 101 to the private address spaces 104, 105, and 106 is performed.

When a frame is sent from the private address spaces 104, 105, and 106 side to the Internet side 101, as shown in FIG. 20A, the duplicate address translating portion 113 of the duplicate addresses-handling server 111 analyzes the frame sent from the switching hub 103 (Step S121a). In a case where the frame corresponds to a VLAN-ID, if the receiver's IP address is addressed to the duplicate addresses-handling server 111 and also the receiver's port is a port for the HTTP proxy, a set [the private address, port number k, and VLAN-ID] of the sender is translated into a set [k, private address and port number of the duplicate addresses-handling server 111] and this is recorded in the translating table (Step S122a, Step S123a, Step 124a, to Step S125a).

Figure 21:
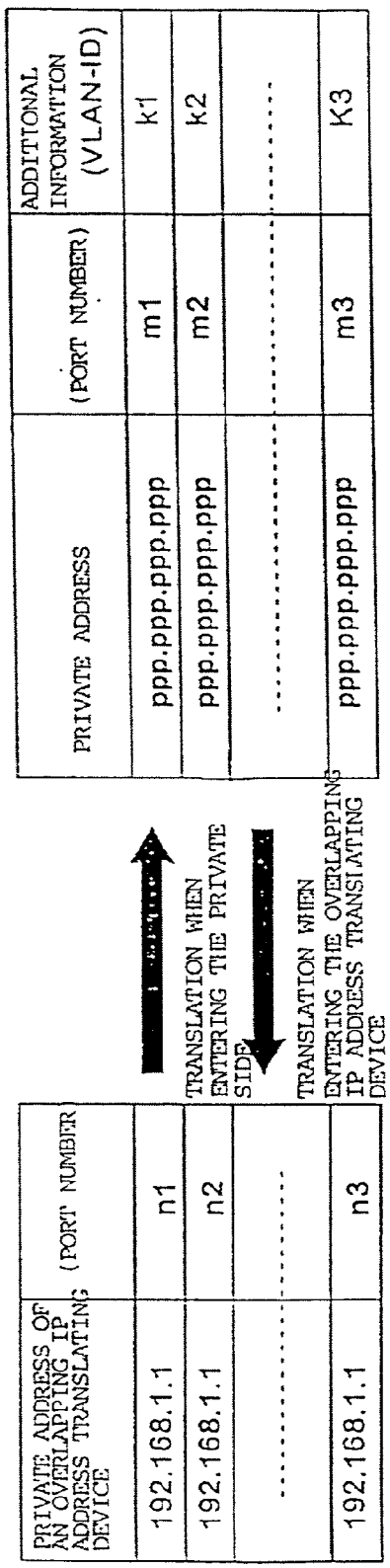
FIG. 21 is an explanatory diagram of the translating tables of Example 2.

FIG. 21 is an explanatory diagram of the translating tables.

As illustrated, for a combination of the private address and additional information (VLAN-ID), a private address of the duplicate addresses-handling server 111 has been determined beforehand. In this translating table, fields standing for port numbers also exist. This is a widely known technique that is used when the number of available global addresses is less than that of private addresses (in many cases, one global address is used). This technique performs mutual translation based on the combination of an IP address+a port number and is referred to as NAPT or IP masquerade.

Thereafter, the server portion 112 performs a normal HTTP proxy processing (Step S126a) and sends the rewritten frame to the Internet 101 side (Step S127a). In Step S122a, if the frame does not correspond to a VLAN-ID, and in Step S123a, if the receiver's port is not a port for HTTP proxy, this frame is discarded (Step S128a). This is one of the error handling methods and other error handling methods may be carried out.

Now, operations when performing translation from the Internet 101 to the private address spaces 104, 105, and 106 shown in FIG. 20B will be described.

In a case where a frame is sent from the Internet 101 side to the private address spaces 104, 105, and 106 side, first, the server portion 112 of the duplicate addresses-handling server 111 performs a reversal proxy processing. That is, the type of packet received from the Internet 101 side is analyzed (Step 121b), a judgement if it is a response to a request due to the processing of FIG. 20A is made (Step S122b), and if so, a reversal HTTP proxy process is performed (Step S123b). The reversal proxy processing is similar to the prior art.

Then, the duplicate address translating portion 113 of the duplicate addresses-handling server 111 performs collation between the translating table of FIG. 21 and the frame, judges, if the address of this frame is identical to the address recorded in the table, that the frame is addressed to the address set in the table by the processing of FIG. 20A, and continues the processing. In this case, by referring to the table in reverse, a set (private address, port number k, and VLAN-ID) which corresponds to a set (192.168.1.1 and port number n) as the destination is determined (Step 124*b*). Based on this information, a section of 192.168.1.1 is rewritten to a pair of a private address and a VLAN-ID, the port number n is rewritten to a port number k (Step S125*b*), and this frame is sent to the private address spaces 104, 105, and 106 side via the switching hub 103 (Step S126*b*).

<Effects>

As has been described above, according to Example 2, the pair of a private address and a VLAN-ID is translated by the NAPT processing and a proxy server function is provided for this translated data, therefore, similar to Example 1, it becomes possible to provide a plurality of networks where overlap of addresses exist with server functions such as Internet proxy services and the like by one server and it is also possible to construct the server portion 112 and the duplicate address translating portion 113 as separate bodies, and in such a case, there is an effect in that the server portion 112 can make use of a conventional server without change.

APPLICABILITY

Furthermore, in the above respective examples, VLAN-IDs have been used as information for identifying the private address spaces 104, 105, and 106, however, as identification information, the present invention is not limited to this information. For example, identification information such as MPLS labels in the MPLS network can be similarly applied and in such a manner as this, any information can be applied as long as the information is unique to the respective private address spaces 104, 105, and 106.

In addition, in the respective examples, IP addresses have been employed as addresses based on a specific protocol, however, the present invention is not limited hereto and any protocol can be applied as long as arbitrary addresses are used in the networks.

Moreover, in the respective examples, the example of a proxy server has been described as server functions of the duplicate addresses-handling servers 102 and 111, however, the present invention is not limited hereto and servers such as a Web server and a mail server can be also similarly applied.

What is claimed is:

1. In a duplicate address translating system which uses private addresses based on a specific protocol in respective private networks and also connects a plurality of private networks, which permit duplicate assignment of private addresses between respective private networks, with a global network which uses a global address based on said specific protocol, the improvement comprises:

an address translating means for performing, in said plurality of private networks, for communications data having identification information for identifying the respective private networks, mutual translation between said plurality of private addresses and said global address with a combination of said identification information and said private addresses, wherein said address translating means comprises;

a switching hub which performs, for communications data having VLAN-IDs for identifying virtual LAN groups that are realized inside said plurality of private address networks, switching based on said VLAN-IDs and a duplicate network address translating device which performs, for frames which are to be switched by said switching hub and have private addresses and VLAN-IDs, mutual translation between said private addresses and said global address with a combination of said VLAN-IDs and said private addresses.

2. In a duplicate address translating system which uses private addresses based on a specific protocol in respective private networks and also connects a plurality of private networks, which permit duplicate assignment of private addresses between respective private networks, with a global network which uses a global address based on said specific protocol, the improvement comprises:

an address translating means for performing, in said plurality of private networks, for communications data having identification information for identifying the respective private networks, mutual translation between said plurality of private addresses and said global address with a combination of said identification information and said private addresses, wherein said address translating means is a multi protocol label switching (MPLS) router-cum-network address translating device which performs, for frames having MPLS labels for identifying the plurality of private networks, routing of an MPLS network based on said MPLS labels and also performs, for frames having said MPLS labels and private addresses, mutual translation between said private addresses and said global address with a combination of said MPLS labels and said private addresses.

3. In a duplicate address translating system which uses private addresses based on a specific protocol in respective private networks and also connects a plurality of private networks, which permit duplicate assignment of private addresses between respective private networks, with a global network which uses a global address based on said specific protocol, the improvement comprises:

an address translating means for performing, in said plurality of private networks, for communications data having identification information for identifying the respective private networks, mutual translation between said plurality of private addresses and said global address with a combination of said identification information and said private addresses, wherein said address translating means comprises;

a multi protocol label switching (MPLS) edge router which performs, for frames having MPLS labels for identifying the plurality of private networks, routing of an MPLS network based on said MPLS labels and also translates said MPLS labels into VLAN-IDs for identifying virtual LAN groups that are realized inside said plurality of private networks and a duplicate address translating device which performs, for frames having VLAN-IDs and private addresses that are translated by said MPLS edge router, mutual translation between said private addresses and said global address with a combination of said VLAN-IDs and said private addresses.

4. A duplicate address network system wherein apparatuses use addresses based on a specific protocol in respective networks and which also comprises a plurality of networks which permit duplicate assignment of addresses between respective networks and a duplicate addresses-handling server which is connected to said plurality of networks via a switching means which performs switching based on identification information of said respective networks, wherein said duplicate addresses-handling server comprises:
a routing table showing the relationship between virtual interfaces which correspond to identification information and network addresses;
a server portion in which the identification information has been related to the virtual interfaces beforehand and which stores, if receiving an arbitrary request from an apparatus in any of the networks, said request and identification information attached to said request, and makes, if making a response to said request, reference to said routing table, selects a virtual interface which has been related to the identification information and with which a network address of a response receiver coincides, and makes a response to said virtual interface, and
a plurality of virtual interfaces for receiving data of said server portion, and further comprises:
a virtual interface processing portion which adds, if receiving response data from any virtual interface, received identification information which has been related to said virtual interface in a routing table and sends said data to said switching means.

5. A duplicate address network system wherein apparatuses use addresses based on a specific protocol in respective networks and which also comprises; a plurality of networks which permit duplicate assignment of addresses between respective networks and a duplicate addresses-handling server which is connected to said plurality of networks via a switching means which performs switching based on identification information of said respective networks, wherein said duplicate address server comprises:
a duplicate address translating portion which performs, if sending and receiving data to and from the switching means, mutual translation between a combination of said identification information of said data and said addresses and a combination of a specific address and different respective ports and
a server portion which accepts a request at said specific address and different respective ports via said duplicate address translating portion and sends response data to said request with said specific address and said applicable port toward said duplicate address translating portion.

* * * * *